US011369870B2

(12) United States Patent
Takahashi et al.

(10) Patent No.: US 11,369,870 B2
(45) Date of Patent: Jun. 28, 2022

(54) METHOD AND SYSTEM FOR DYNAMIC NOTATION IN A GAME SYSTEM

(71) Applicant: Unity IPR ApS, Copenhagen K (DK)

(72) Inventors: David Keio Takahashi, Snohomish, WA (US); Christopher John Addison, Redmond, WA (US); Leo Soong, Seattle, WA (US); Stacey Ann Haffner, Monroe, WA (US); Brett Hickenbottom, Carnation, WA (US)

(73) Assignee: Unity IPR ApS, Copenhagen (DK)

( * ) Notice: Subject to any disclaimer, the term of this patent is extended or adjusted under 35 U.S.C. 154(b) by 74 days.

(21) Appl. No.: 16/732,819

(22) Filed: Jan. 2, 2020

(65) Prior Publication Data
US 2020/0215430 A1    Jul. 9, 2020

Related U.S. Application Data

(60) Provisional application No. 62/787,988, filed on Jan. 3, 2019.

(51) Int. Cl.
*G06T 19/20*   (2011.01)
*A63F 13/25*   (2014.01)
*A63F 13/30*   (2014.01)
*A63F 13/40*   (2014.01)
*A63F 13/63*   (2014.01)
*A63F 13/77*   (2014.01)

(52) U.S. Cl.
CPC .............. *A63F 13/30* (2014.09); *A63F 13/40* (2014.09); *A63F 13/63* (2014.09); *A63F 13/77* (2014.09); *A63F 2300/407* (2013.01); *A63F 2300/552* (2013.01)

(58) Field of Classification Search
CPC .. A63F 13/25; A63F 2300/8082; G06F 9/543; G06T 19/20; G06T 2219/004; G06T 2219/024
See application file for complete search history.

(56) References Cited

U.S. PATENT DOCUMENTS

2019/0324826 A1* 10/2019 Abuelata ................. G06F 3/048
2020/0098194 A1*  3/2020 Jones ..................... A63F 13/25
2020/0159396 A1*  5/2020 Breymann .......... G06F 3/04845

* cited by examiner

*Primary Examiner* — Lawrence S Galka
(74) *Attorney, Agent, or Firm* — Schwegman Lundberg & Woessner, P.A.

(57) ABSTRACT

Systems and methods for generating a dynamic note and associating the dynamic note to a game object are disclosed. The game object is selected in a digital environment. The dynamic note is associated to the game object. Data is added to the dynamic note. The added data can include data describing a state of the environment and a state of the game object and include a link to the game object. Data associated with the dynamic note is sent over a network to a data storage device on a server. An aspect of the dynamic note is displayed within the digital environment.

12 Claims, 6 Drawing Sheets

METHOD AND SYSTEM FOR DYNAMIC NOTATION IN A GAME SYSTEM

CROSS-REFERENCE TO RELATED APPLICATIONS

This application claims the benefit of U.S. Provisional Application No. 62,787,988, filed Jan. 3, 2019, which is incorporated by reference herein in its entirety.

TECHNICAL FIELD

The subject matter disclosed herein generally relates to the technical field of computer systems and, in one specific embodiment, to computer systems and methods for use in creating and manipulating dynamic notes within a game system.

BRIEF DESCRIPTION OF THE DRAWINGS

Further features and advantages of the present invention will become apparent from the following detailed description, taken in combination with the appended drawings, in which.

DETAILED DESCRIPTION

Figure 1:
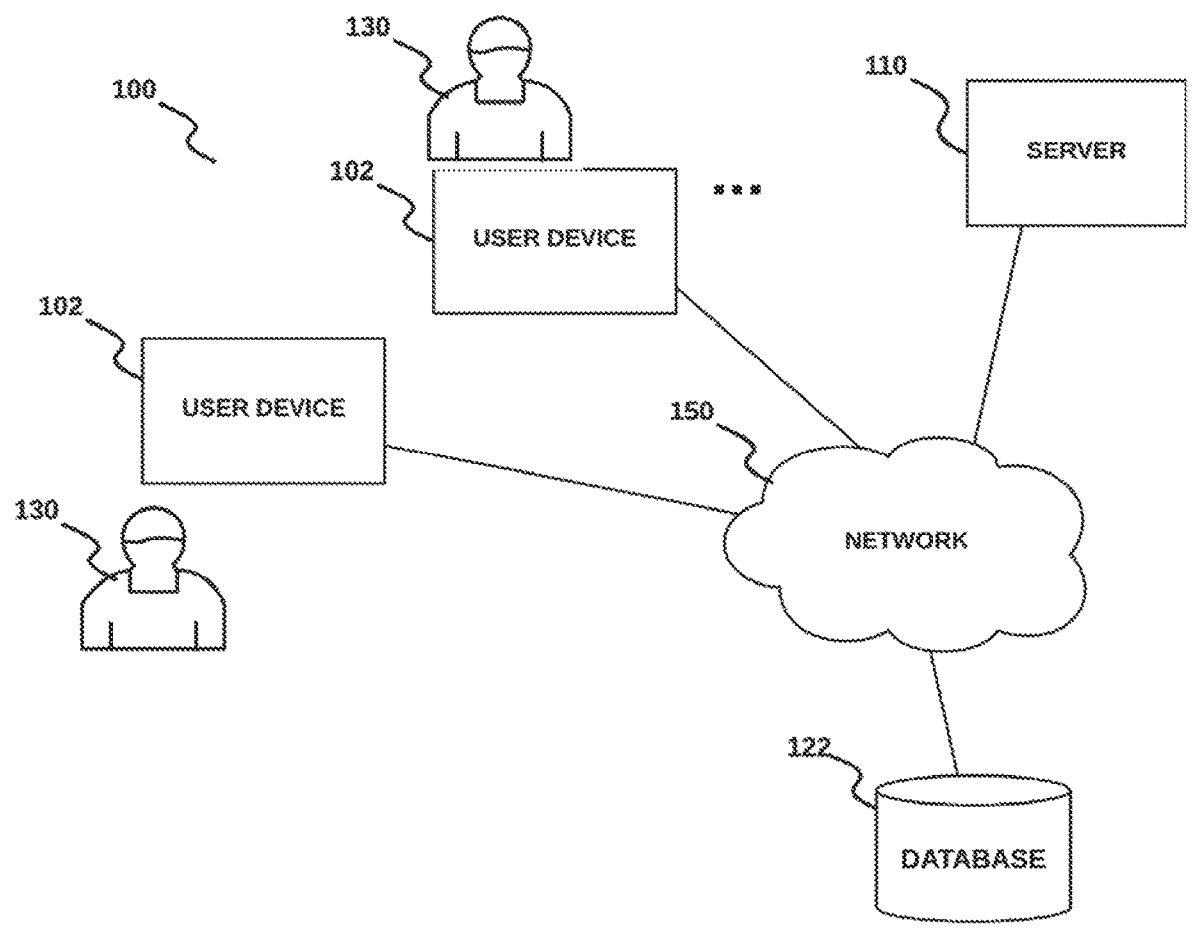
FIG. 1 is a schematic illustrating dynamic note management system, in accordance with one embodiment.

The description that follows describes systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used throughout the description herein should be understood to include any digital object or digital element within an environment, including actions and effects on the environment. For example, a game object can represent (e.g., in a corresponding data structure) anything within the environment; including 3D models (e.g., characters, weapons, scene elements such as buildings, trees, cars, and the like, entire scenes, treasures, backgrounds), effects (e.g., sound and visual), 3D model textures, animation, and more. A game object is associated with data that defines properties and behavior for the object.

The terms 'asset', 'game asset', and 'digital asset', used throughout the description herein are understood to include any data that can be used to describe a game object or can be used to describe an aspect of a game or project. For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'build' and 'game build' used throughout the description herein should be understood to include a compiled binary code of a game which can be executed on a device, and which, when executed can provide a playable version of the game (e.g., playable by a human or by an artificial intelligence agent).

The term 'runtime' used throughout the description herein should be understood to include a time during which a program (e.g., an application, a video game, a simulation, and the like) is running, or executing (e.g., executing programming code). The term should be understood to include a time during which a video game is being played by a human user or an artificial intelligence agent.

In example embodiments, systems and methods for generating a dynamic note and associating the dynamic note to a game object are disclosed. The game object is selected in a digital environment. The dynamic note is associated to the game object. Data is added to the dynamic note. The added data can include data describing a state of the environment and a state of the game object and include a link to the game object. Data associated with the dynamic note is sent over a network to a data storage device on a server. An aspect of the dynamic note is displayed within the digital environment.

Turning now to the drawings, systems and methods, including non-routine or unconventional components or operations, or combinations of such components or operations, for creating and manipulating dynamic notes attached to game objects within an environment, in accordance with embodiments of the invention, are illustrated. In many embodiments, the dynamic notes are associated with game objects within a project, allowing collaboration between users as described herein. In accordance with some embodiments, the dynamic notes can be used for conversational communication, based around a game object, between two users on different user devices as described herein. Dynamic notes as described herein provide a method and system for creating a conversation centered around a game object within a scene (e.g., a 3D development environment for a game) in order to provide users a high degree of context.

In accordance with an embodiment, and shown in FIG. 1 is a dynamic note management system 100 (or simply 'dynamic note' system 100 or 'the system' 100). In the example embodiment, the system 100 includes a user device 102 operated by a user 130 (e.g., a game player, a viewer, or the like), a server 110, and a database 122, all coupled in networked communication via a network 150 (e.g., a cellular network, a Wi-Fi network, the Internet, a wired local network, and the like). In the example embodiment shown in FIG. 1, two user devices 102 are shown, but any number of devices 102 may be used in the system 100. Embodiments of this present disclosure are not limited in this regard.

In accordance with an embodiment, the user device 102 is a computing device capable of providing a multimedia experience (e.g., a video game, a simulation, a virtual reality experience, an augmented reality experience, a 3D content creation experience, and the like) to the user 130. In some embodiments, the user device 102 is a mobile computing device, such as a smartphone or a tablet computer and in other embodiments the user device 102 is a desktop computer or game console. In still other embodiments, the user device 102 is a head mounted display device (HMD) capable of displaying virtual reality and/or augmented reality experiences.

Figure 2A:
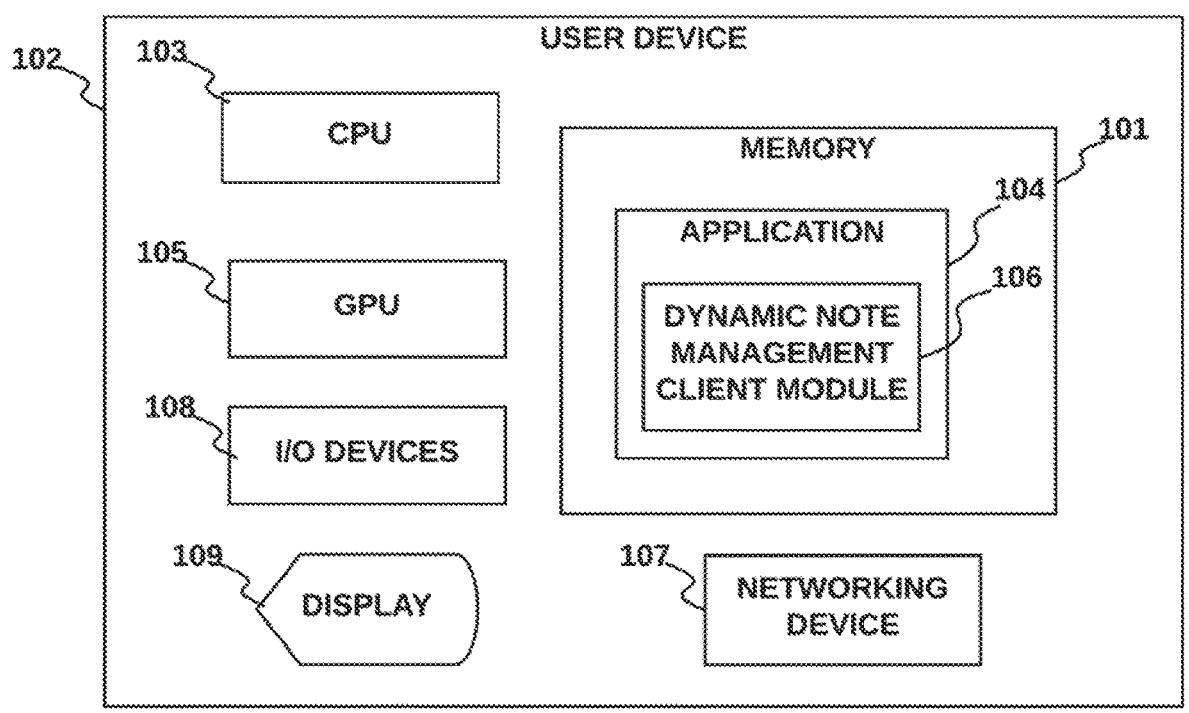
FIG. 2A is a schematic illustrating a user device within a dynamic note management system, in accordance with one embodiment.

In accordance with an embodiment, FIG. 2A shows a user device 102 which includes one or more central processing units 103 (CPUs), and graphics processing units 105 (GPUs). The CPU 103 is any type of processor, processor assembly comprising multiple processing elements (not shown), having access to a memory 101 to retrieve instructions stored thereon, and execute such instructions. Upon execution of such instructions, the instructions implement the user device 102 to perform a series of tasks as described herein. The memory 101 can be any type of memory device, such as random access memory, read only or rewritable memory, internal processor caches, and the like.

The user device 102 also includes one or more input/output devices 108 such as, for example, a keyboard or keypad, mouse, pointing device, and touchscreen. The user device 102 further includes one or more display devices 109, such as a computer monitor, a touchscreen, and a head mounted display, which may be configured to display a multimedia experience including a video game environment or virtual simulation environment to the user. The display device 109 is driven or controlled by the one or more GPUs 105 and optionally the CPU 103. The GPU 105 processes aspects of graphical output that assists in speeding up rendering of output through the display device 109. The user device 102 also includes one or more networking devices 107 (e.g., wired or wireless network adapters) for communicating across the network 150.

The user device 102 also includes a memory 101 configured to store an application 104 (e.g., executed by the CPU 103 or GPU 105) that communicates with the display device 109 and also with other hardware such as the input device(s) 108 to present a 3D content creation application to a user. The application 104 would typically include one or more modules that provide the following: animation physics for game objects, collision detection for game objects, rendering, networking, sound, animation, and the like in order to provide the user with a 3D content creation environment (e.g., Unity Editor™ from Unity Technologies™ which includes a game engine). The application 104 includes computer-executable instructions residing in the memory 101 that are executed by the CPU 103 and optionally with the GPU 105 during operation in order to create a runtime program such as a game engine or 3D content creation application. The application 104 includes a dynamic note management client module 106 (or simply 'client module' 106) that provides various dynamic note system 100 functionality as described herein. The client module 106 includes computer-executable instructions residing in the memory 101 that are executed by the CPU 103 and optionally with the GPU 105 during operation. The client module 106 may be integrated directly within the application 104, or may be implemented as an external piece of software (e.g., a plugin).

Figure 2B:
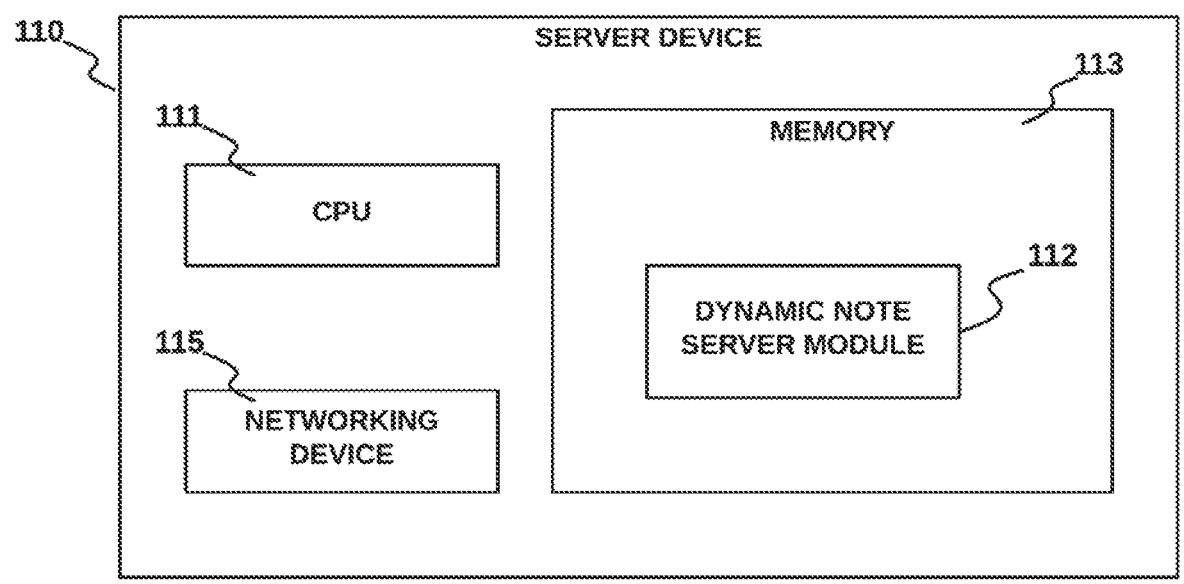
FIG. 2B is a schematic illustrating a server device within a dynamic note management system, in accordance with one embodiment.

In accordance with an embodiment, and shown in FIG. 2B is a server device 110 which includes a CPU 111 and a networking device 115 for communicating across the network 150. The server 110 also includes a memory 113 for storing a dynamic note server module 112 (or simply 'server module') that provides various dynamic note system 100 functionality as described herein. The server module 112 includes computer-executable instructions residing in the memory 113 that are executed by the CPU 111 during operation.

In accordance with an embodiment, a dynamic note (or simply 'note') is a persistent, addressable identifier that contains data and is associated with a game object or game asset within a game. In accordance with an embodiment, one game object can have a plurality of associated notes whereby and each note of the plurality of associated notes can be any one of a supported type of note. A note type can include a comment, a file, an image, a hyperlink, a game object and more. In accordance with an embodiment, a note type has a specific data format. For example, a 'comment' note type includes serialized data that includes text, and a 'link' note type includes serialized data for a hypertext link (e.g., serialized data is data in a format that allows the data to be stored in a file or transported over a network). Similarly, a 'file' note type includes serialized data that represents a file of any file type. Using the polymorphism provided by the "type" and "data" fields and by storing the "data" field as a single contiguous data element on the server, a note can be any text-serializable data type. In accordance with an embodiment, a note includes display instructions for data within the note. The display instructions within a note can be used to create a user interface element for the note which displays certain aspects of the note data.

Figure 3:
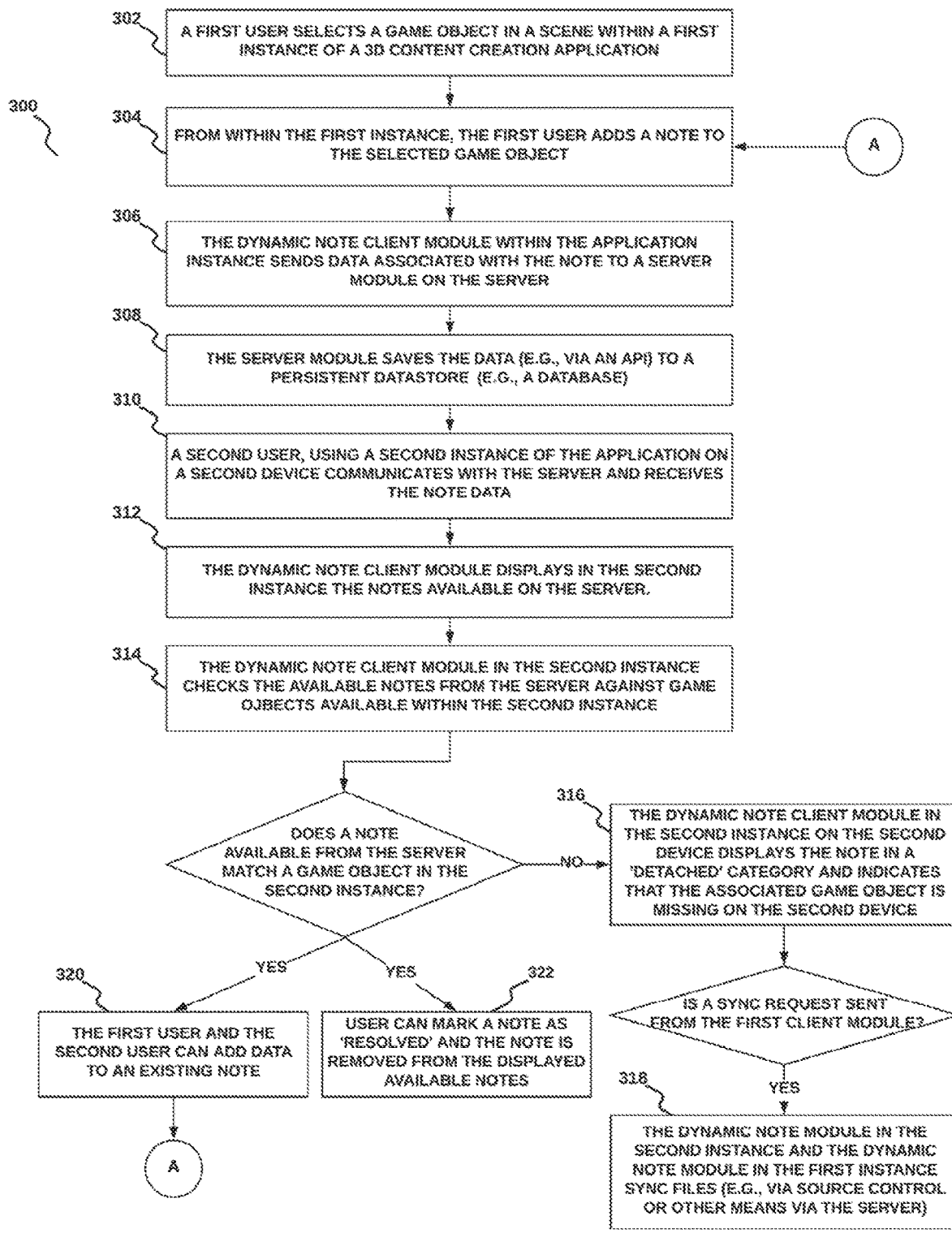
FIG. 3 is an illustration of a method for creating and managing a dynamic note within a dynamic note system, in accordance with one embodiment.

In accordance with an embodiment, and shown in FIG. 3, is a method 300 for creating and manipulating dynamic notes within a dynamic note system 100. During operation 302 of the method 300, in a first instance of a 3D content creation application 104 (e.g., an execution of the Unity Editor™), a first user selects a game object in an environment (e.g., a scene within the game) displayed within a user interface of an execution of the 3D content creation application 104. In accordance with an embodiment, the game object and environment are part of a project within the 3D content creation application 104. In accordance with an embodiment, the project includes data (e.g., files) that describe game objects, environments and settings for a game. The project may be shared by a plurality of 3D content creation applications 104 on a plurality of user devices 102. In accordance with another embodiment, the user can select a game asset from a user interface (UI), such as a UI window within the application 104. For example, the UI window may present a list of game assets associated with the game. In accordance with an embodiment, during operation 304 of the method 300, the first user creates a note and associates the note to the selected game object. The creation being done within the first instance of the 3D content creation application 104. As part of operation 304, the first user can add text and select options for the note. An option can include the recording of data describing the environment (e.g., data describing an environment in the proximity of the game object) and data describing a state of the 3D content creation application. For example, the data can include information on a camera angle from which the first user is viewing the game object within the environment. As part of operation 304, the client module 106 structures the data within the note such that one game object can have a plurality of associated notes whereby each note of the plurality of associated notes can be any one of a type of note. Part of structuring the data includes marshalling the data so that the data is serialized (e.g., in a format that allows the data to be stored in a file or transported over a network). In accordance with an embodiment, serialized data within a note is associated to a game object across multiple instances of a project as seen below with respect to operations 306 to 322 inclusive. In accordance with an embodiment, as part of operation 304, a note is created programmatically by using instructions within code of the application 104. The instructions may be compiled and executed to create a note based on the content of the instructions. In accordance with an embodiment, during operation 306 of the method 300, the client module 106 sends data associated with a note to the server module 112 on the server device 110.

In accordance with an embodiment, during operation 308 of the method 300, the server module 112 saves the data to a persistent datastore (e.g., the database 122). The data can be moved to and from the database 122 with an application interface (API). During operation 310 of the method 300, a second user interacting with a second instance of the application 104 executing on a second user device 102, receives data from the server 110 regarding the note. In accordance with an embodiment, as part of operation 310, the client module 106 on the second user device 106 sends a request to the server module 112 for data associated with a plurality of notes. In accordance with an embodiment, the request from the second user device is a request for a plurality of notes within the project. In accordance with an embodiment, the second instance of the application 104 receives the data during a first communication between the second instance on the second device and the server module 112 after the note is created on the server 110 (e.g., as the second instance of the application communicates with the server module 112 for a first time after creation of the note). In accordance with an embodiment, as part of operation 310, the client module 106 on the second user device 102 records (e.g., in a cache file) data for a plurality of notes received from the server module 112 (e.g., received as part of operation 310). In accordance with an embodiment, as part of operation 310, the client module 106 on a device 102 only sends a request to the server module 112 for data associated with notes that have not yet been received by the client module 106 of the device 102. In accordance with an embodiment, during operation 312, the dynamic note client module 106 on the second user device 102 displays data from the note on a display device 109 of the second user device 102 (e.g., via a UI window). In accordance with an embodiment, the displayed data shows notes from the server module 112 (e.g., displayed in a list format). In accordance with an embodiment, the displayed data indicates an association of a note with a particular game object with which the note is associated (e.g., associated as part of operation 304). In accordance with an embodiment, the client module 106 displays data from a selection of notes wherein the selection is determined by one or more of: a user 130 via an input device 108, or by the module 106 (e.g., determined by game objects visible in the environment as seen via the UI). In operation 314 of the method 300, the dynamic note client module 106 in the second instance compares a list of notes received from the server module 112 against game objects within the second instance. In accordance with an embodiment, in operation 316 of the method 300, based on a received note not having an associated game object in the second instance (e.g., based on a deletion of the associated game object in the second instance), the client module 106 displays data associated with the note in a special way (e.g., in a detached category) which indicates that the game object associated with the note is missing. In accordance with an embodiment, a game object may include an identification number or code to differentiate the game object from other game objects (e.g., wherein the other game objects are within the project). The identification number or code may help identify copies of a game object on the first user device and the second user device (e.g., so that two different users may work on the same game object). In accordance with an embodiment, as part of operation 318 of the method 300, based on the client module 106 in the second device sending a sync request (e.g., due to input from a user), the dynamic note module 106 in the first instance and the dynamic note module 106 in the second instance synchronize data (e.g., files). In accordance with an embodiment, the request to sync data may be sent to the client module 106 on the first device via the network 150, or the request may be sent to the server 110 via the network 150. The request includes an inquiry for data associated with a missing game object. The synchronization of data may be performed via source control or other means. In accordance with an embodiment, the request may include a project name or identification number and the synchronization may be performed on data associated with the project.

In accordance with an embodiment, the method 300 allows the system 100 to display and share a note (and associated data) between a first instance of the application 104 on a first device 102 and a second instance of the application 104 on a second device 102, without the two instances having the same game objects. Notes can be shared and displayed independently of sharing of game object data to which the notes are associated.

In accordance with an embodiment, during operation 320 of the method, based on a received note having an associated game object in the second instance, the client module 106 in the second instance and the client module 106 in the first instance can add data to an existing note (e.g., as in operation 304). Operation 320 can be used to create conversations within a note. In accordance with an embodiment, as part of operation 322, based on a received note having an associated game object in the second instance, a note can be marked as "Resolved" by a user (e.g., by clicking a button) whereby the note is archived and removed from display.

In accordance with an embodiment, the data structure of a note can be configured on the server module 112 with instructions sent from a client module 106 (e.g., to create custom note tools). For example, a client module 106 could send programming instructions (e.g., JSON data) and build a custom UI to create advanced functions (e.g., a work item tracking system).

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 4:
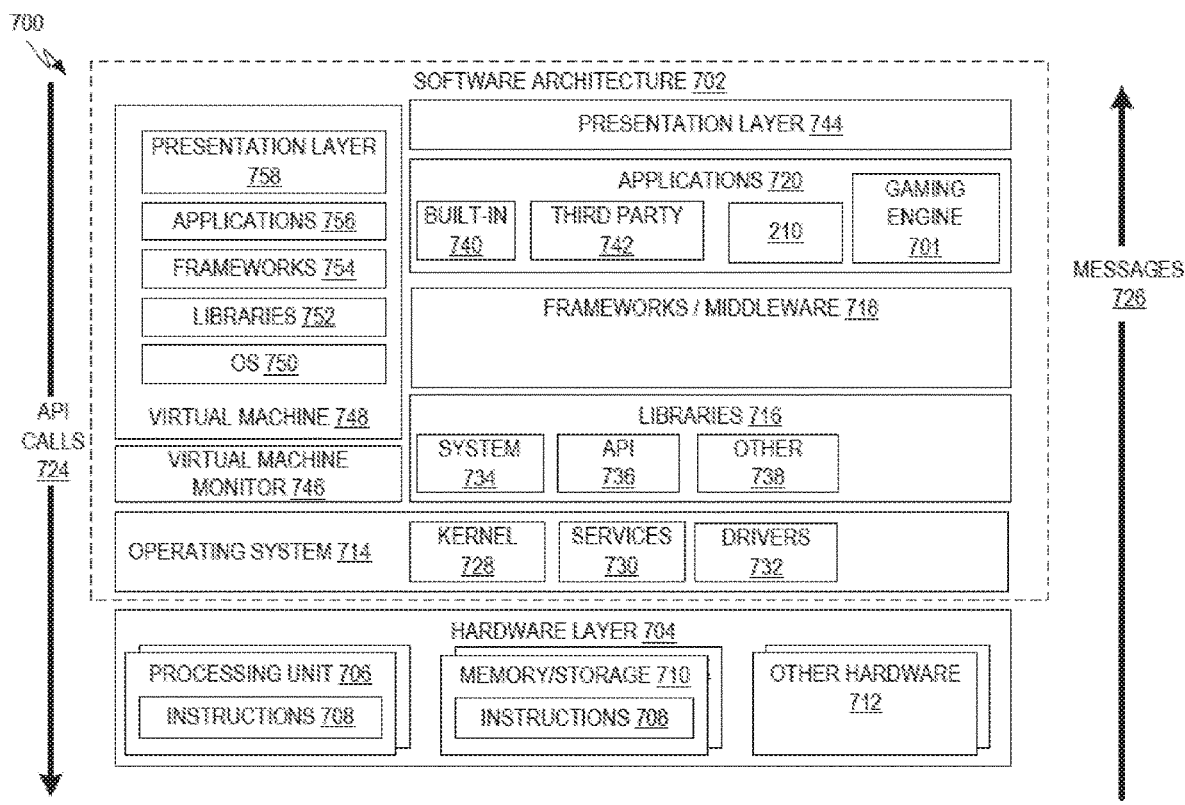
FIG. 4 is a block diagram illustrating an example software architecture, which may be used in conjunction with various hardware architectures described herein.

FIG. 4 is a block diagram 700 illustrating an example software architecture 702, which may be used in conjunction with various hardware architectures herein described to provide a gaming engine 701 and/or components of the dynamic note system 100. FIG. 4 is a non-limiting example of a software architecture and it will be appreciated that many other architectures may be implemented to facilitate the functionality described herein. The software architecture 702 may execute on hardware such as a machine 800 of FIG. 5 that includes, among other things, processors 810, memory 830, and input/output (I/O) components 850. A representative hardware layer 704 is illustrated and can represent, for example, the machine 800 of FIG. 5. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 4, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 4, this is illustrated by a virtual machine 748. The virtual machine 748 creates a software environment where applications/modules can execute as if they were executing on a hardware machine (such as the machine 800 of FIG. 5, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 5:
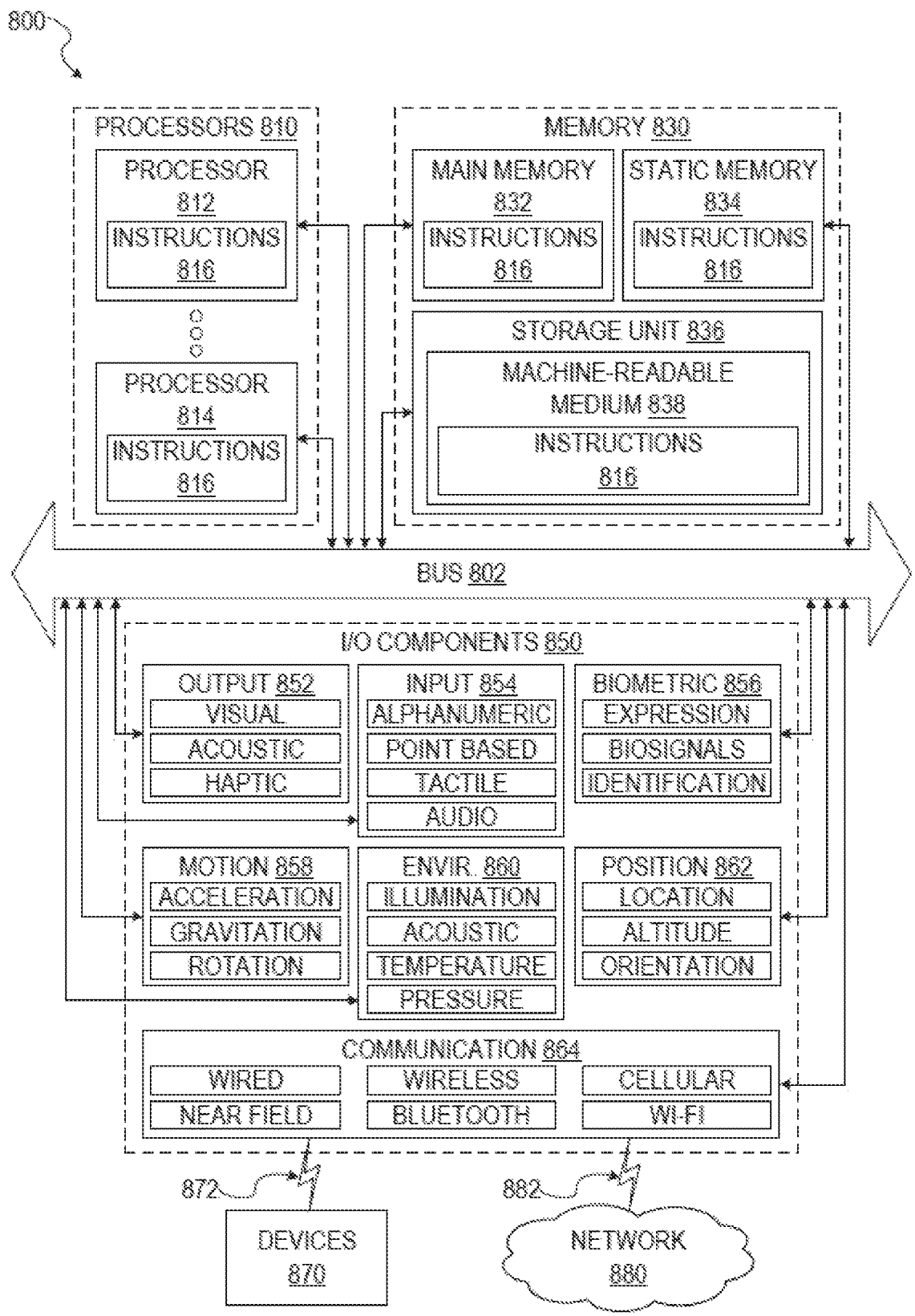
FIG. 5 is a block diagram illustrating components of a machine, according to some example embodiments, configured to read instructions from a machine-readable medium (e.g., a machine-readable storage medium) and perform any one or more of the methodologies or operations discussed herein.

FIG. 5 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 800 is similar to the user device 102. Specifically, FIG. 5 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 5 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 5. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi™ signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
one or more computer processors;
one or more computer memories;
a set of instructions stored in the one or more computer memories, the set of instructions configuring the one or more computer processors to perform operations comprising:
receiving a selection of a game object in a digital environment being presented within a first instance of an application;
associating a dynamic note to the game object;
adding data to the dynamic note, wherein the data describes a state of the digital environment and a state of the game object;
sending data associated with the dynamic note over a network from the first instance of the application to a data storage device on a server;
wherein the sending of the data causes an aspect of the dynamic note to be displayed within the digital environment as it is being presented in a second instance of the application based on a determination that the game object is visible within the digital environment as it is being presented in the second instance of the application, comparing a first list of dynamic notes associated with a project and which are on the server with a second list of dynamic notes associated with the project and which are on the second instance, downloading to the second instance data associated with dynamic notes which are on the first list but not on the second list, determining that the game object associated with a downloaded dynamic note is not being presented within the second instance, based on the determination, requesting from the second instance game object data for the game object; and synchronizing the second instance with the game object data for the game object, wherein each of the downloaded dynamic notes are associated with a game object for the project on the second instance based on data within the dynamic note that includes a link to the game object.

2. The system of claim 1, wherein a game object includes the following:
   a digital object or digital effect within a digital environment;
   game asset data which describes the game object; and
   dynamic note data associated with the game object.

3. The system of claim 1, wherein the data associated with the dynamic note is stored in a single contiguous data block as a text serializable data type.

4. The system of claim 1, wherein the digital environment is a video game environment produced by a game engine and displayed via a display device.

5. A method comprising:
   receiving, using one or more computer processors, a selection of a game object in a digital environment of a first instance of an application;
   associating a dynamic note to the game object;
   adding data to the dynamic note, wherein the data describes a state of the digital environment and a state of the game object with respect to the first instance of the application;
   sending data associated with the dynamic note over a network from the first instance of the application to a data storage device on a server;
   wherein the sending of the data causes an aspect of the dynamic note to be displayed within the digital environment as it is being presented in a second instance of the application based on a determination that the game object is visible within the digital environment as it is being presented in the second instance of the application, comparing a first list of dynamic notes associated with a project and which are on the server with a second list of dynamic notes associated with the project and which are on the second instance, downloading to the second instance data associated with dynamic notes which are on the first list but not on the second list, determining that the game object associated with a downloaded dynamic note is not being presented within the second instance, based on the determination, requesting from the second instance game object data for the game object; and synchronizing the second instance with the Same object data for the Same object, wherein each of the downloaded dynamic notes are associated with a game object for the project on the second instance based on data within the dynamic note that includes a link to the game object.

6. The method of claim 5, wherein a game object includes the following:
   digital object or digital effect within a digital environment;
   game asset data which describes the game object; and
   dynamic note data associated with the game object.

7. The method of claim 5, wherein the data associated with the dynamic note is stored in a single contiguous data block as a text serializable data type.

8. The method of claim 5, wherein the digital environment is a video game environment produced by a game engine and displayed via a display device.

9. A non-transitory machine-readable storage medium comprising a set of instructions that, when executed by one or more computer processors, cause the one or more computer processors to perform operations, the operations comprising:
   receiving a selection of a game object in a digital environment being presented within a first instance of an application;
   associating a dynamic note to the game object;
   adding data to the dynamic note, wherein the data describes a state of the digital environment and a state of the game object; and
   sending data associated with the dynamic note over a network from the first instance of the application to a data storage device on a server;
   wherein the sending of the data causes an aspect of the dynamic note to be displayed within the digital environment as it is being presented in a second instance of the application based on a determination that the game object is visible within the digital environment as it is being presented in the second instance of the application, comparing a first list of dynamic notes associated with a project and which are on the server with a second list of dynamic notes associated with the project and which are on the second instance, downloading to the second instance data associated with dynamic notes which are on the first list but not on the second list, determining that the game object associated with a downloaded dynamic note is not being presented within the second instance, based on the determination, requesting from the second instance game object data for the game object; and synchronizing the second instance with the game object data for the game object, wherein each of the downloaded dynamic notes are associated with a game object for the project on the second instance based on data within the dynamic note that includes a link to the Same object.

10. The non-transitory machine-readable storage medium of claim 9, wherein a game object includes the following:
    a digital object or digital effect within a digital environment;
    game asset data which describes the game object; and
    dynamic note data associated with the game object.

11. The non-transitory machine-readable storage medium of claim 9, wherein the data associated with the dynamic note is stored in a single contiguous data block as a text serializable data type.

12. The non-transitory machine-readable storage medium of claim 9, wherein the digital environment is a video game environment produced by a game engine and displayed via a display device.

* * * * *